US011908251B2

(12) United States Patent
Mitchell et al.

(10) Patent No.: US 11,908,251 B2
(45) Date of Patent: Feb. 20, 2024

(54) DETECTION OF NETWORK ISSUES AND HEALTH REPORTING TO GROUND-BASED STAKEHOLDERS

(71) Applicant: Honeywell International Inc., Charlotte, NC (US)

(72) Inventors: Derek Mitchell, Kirkland, WA (US); Divya Swarup Giriyappa Srinivasan, Bangalore (IN); Thomas D. Judd, Woodinville, WA (US)

(73) Assignee: Honeywell International Inc., Charlotte, NC (US)

( * ) Notice: Subject to any disclaimer, the term of this patent is extended or adjusted under 35 U.S.C. 154(b) by 233 days.

(21) Appl. No.: 17/571,300

(22) Filed: Jan. 7, 2022

(65) Prior Publication Data
US 2023/0154253 A1 May 18, 2023

(30) Foreign Application Priority Data

Nov. 12, 2021 (IN) .............................. 202111051926

(51) Int. Cl.
*G07C 5/08* (2006.01)
*G07C 5/00* (2006.01)
(Continued)

(52) U.S. Cl.
CPC .......... *G07C 5/0816* (2013.01); *G07C 5/008* (2013.01); *G08C 17/02* (2013.01); *H04B 7/18506* (2013.01); *B64D 2045/0085* (2013.01)

(58) Field of Classification Search
CPC .... G07C 5/0816; G07C 5/008; G07C 5/0841; G08C 17/02; H04B 7/18506; B64D 2045/0085
(Continued)

(56) References Cited

U.S. PATENT DOCUMENTS 8,929,830 B2  1/2015  Ludwig et al.
9,652,901 B2  5/2017  Buehler et al.
(Continued)

FOREIGN PATENT DOCUMENTS

CN  102930748 B  4/2015
CN  106034147 A  10/2016
(Continued)

OTHER PUBLICATIONS

European Patent Office, "Extended European Search Report", from U.S. Appl. No. 17/571,300, filed Mar. 21, 2023, from Foreign Counterpart to U.S. Appl. No. 17/571,300, filed Mar. 21, 2023, pp. 1 through 7, Published: EP.

*Primary Examiner* — Omar Casillashernandez
(74) *Attorney, Agent, or Firm* — Fogg & Powers LLC

(57) ABSTRACT

Systems and methods for detection of network issues and health reporting to ground-based stakeholders are described herein. In exemplary embodiments, a system includes multiple aircraft, wherein an aircraft in the multiple aircraft communicates through one or more communication links. The aircraft includes processors that compile network event information related to degraded communication link events. Further, the aircraft includes memory units that store a degraded link event report and a configuration database, wherein the degraded link event report stores the network event information related to the degraded communication link events as directed the configuration database. The system additionally includes a network issue detector, in communication with the multiple aircraft, which receives degraded link event reports from the multiple aircraft, wherein the network issue detector includes processors that identify systemic degraded data link network problems with the communication links based on context identified in the degraded link event reports.

20 Claims, 5 Drawing Sheets

(51) Int. Cl.
    *H04B 7/185*     (2006.01)
    *G08C 17/02*     (2006.01)
    *B64D 45/00*     (2006.01)

(58) Field of Classification Search
    USPC .......................................................... 340/945
    See application file for complete search history.

(56) References Cited

U.S. PATENT DOCUMENTS

| | | | |
|---|---|---|---|
| 10,263,688 B2 | 4/2019 | McGuffin | |
| 10,425,149 B1 | 9/2019 | Judd et al. | |
| 2015/0117466 A1* | 4/2015 | Summer | H04L 43/0852 |
| | | | 370/465 |
| 2015/0350457 A1* | 12/2015 | Lauer | H04B 7/18508 |
| | | | 455/408 |
| 2018/0290748 A1* | 10/2018 | Corban | G02B 27/017 |
| 2020/0036612 A1* | 1/2020 | Walsh | H04L 43/08 |
| 2020/0169458 A1* | 5/2020 | Rahmes | H04B 7/18506 |
| 2022/0189316 A1* | 6/2022 | Paul | G05D 1/0022 |
| 2022/0217706 A1* | 7/2022 | Casey | H04B 7/18506 |

FOREIGN PATENT DOCUMENTS

| | | |
|---|---|---|
| CN | 106516159 B | 8/2018 |
| EP | 3139542 A1 | 3/2017 |
| EP | 3486739 A1 | 5/2019 |

\* cited by examiner

DETECTION OF NETWORK ISSUES AND HEALTH REPORTING TO GROUND-BASED STAKEHOLDERS

CROSS-REFERENCE TO RELATED APPLICATIONS

The present application claims benefit of Indian Patent Application Serial No. 202111051926 filed Nov. 12, 2021; the entire contents of the aforementioned patent application is incorporated herein by reference as if set forth in its entirety.

BACKGROUND

Aircraft operation generally includes the operation of multiple systems that communicate through different communication links with ground communication systems. These communication links include VHF, HF, satellite communication, and other communication links. On some aircraft, a communication management unit (CMU) has access to various statuses of the different communication links. The CMU can monitor the number of queued messages transmitted across the communication links and infer network issues. Examples of network issues may include channel utilization, received signal strength, message delivery issues, and latency issues measured from received acknowledgments (or analyzing timestamps of messages) from the ground systems.

SUMMARY

Systems and methods for detection of network issues and health reporting to ground-based stakeholders are described herein. In exemplary embodiments, a system includes a plurality of aircraft, wherein an aircraft in the plurality of aircraft communicates through one or more communication links. The aircraft includes one or more processors that compile network event information related to degraded communication link events. Further, the aircraft includes one or more memory units that store a degraded link event report and a configuration database, wherein the degraded link event report stores the compiled network event information related to the degraded communication link events as directed by information in the configuration database. The system additionally includes a network issue detector in communication with the plurality of aircraft, wherein the network issue detector receives degraded link event reports from the plurality of aircraft, wherein the network issue detector includes one or more network issue detector processors that identify systemic degraded data link network problems with the one or more communication links based on context identified in the degraded link event reports.

DRAWINGS

Understanding that the drawings depict only exemplary embodiments, the drawings are not, therefore, to be considered limiting in scope. This specification describes exemplary embodiments with additional specificity and detail through the use of the accompanying drawings, in which.

Figure 1:
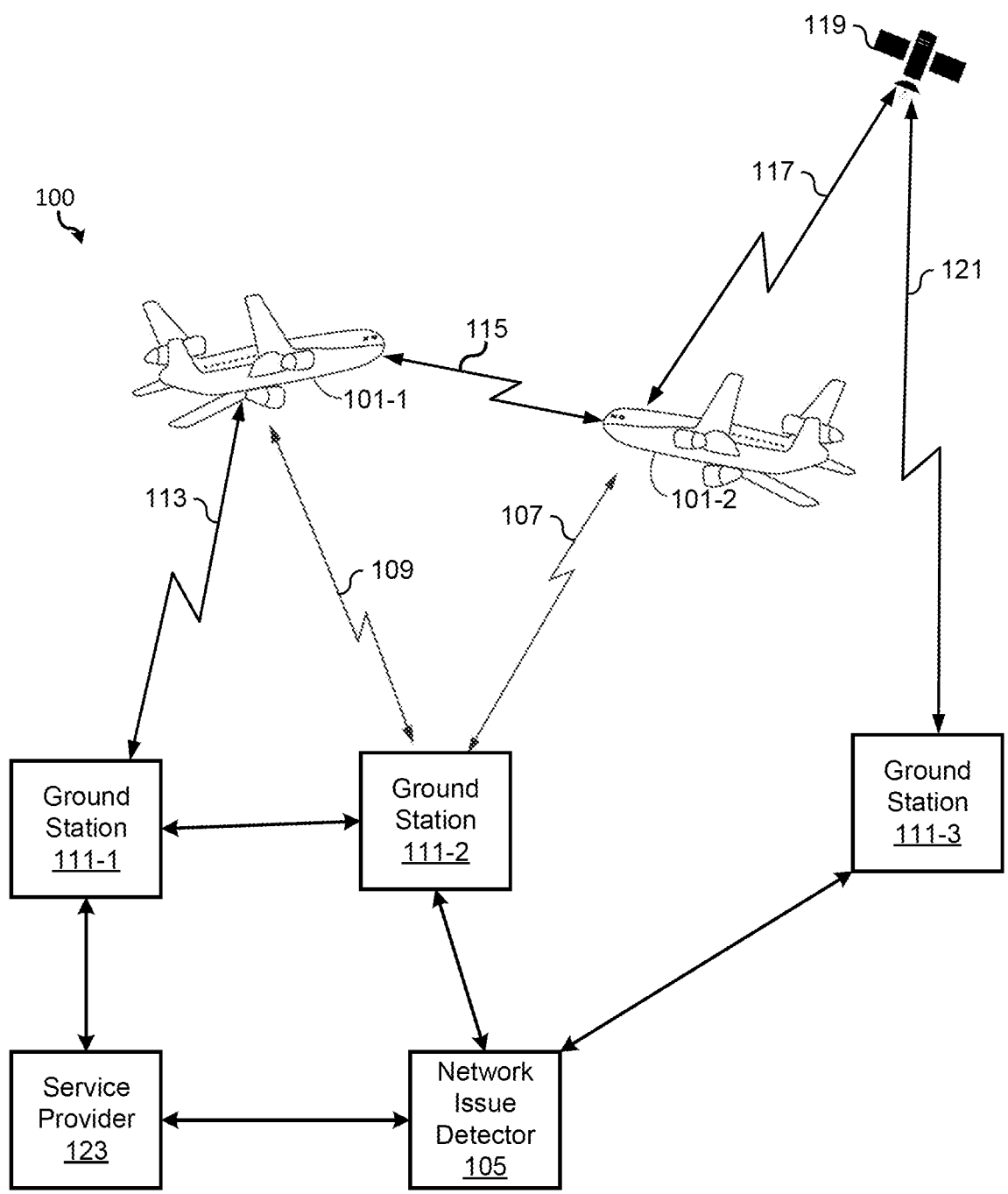
FIG. 1 is a drawing illustrating multiple aircraft in communication with multiple ground stations according to an aspect of the present disclosure.

Per common practice, the various features described herein are not drawn to scale but are drawn to emphasize specific features relevant to the exemplary embodiments.

DETAILED DESCRIPTION

In the following detailed description, reference is made to the accompanying drawings that form a part hereof, and in which is shown, by way of illustration, specific illustrative embodiments. However, it is to be understood that other embodiments may be utilized, and that logical, mechanical, and electrical changes may be made. Furthermore, the method(s) presented in the drawings and the specification is not to be construed as limiting the order in which the individual steps may be performed. The following detailed description is, therefore, not to be taken in a limiting sense.

The present disclosure describes systems and methods for detecting network issues (past, present, and predicting future issues) in air-ground data communication links and for providing health reports for the communication links to ground-based stakeholders so that the ground-based stakeholders are aware of the issues to identify potential actions that can resolve the issues. In particular, processors on multiple aircraft gather health information for one or more communication links. As used in the present disclosure, health information refers to quantitative and qualitative information associated with the operational health of a communication link. Also, the health information may include information that represents the context around communications using the communication links. The context around a communication may include the communication itself, the location of the transmitter and/or receiver of the communication, the time of the communication, information regarding other related communications, operational status of the transmitter and receiver, type of communication, or other information potentially related to the communication. Information may relate to the communication if the information represents the operation of a system, an environmental factor, or other aspect that potentially affects transmissions through a communication link.

As described herein, a processor that gathers data link network health information operates on an aircraft. For example, the processor may be a communications management unit (CMU), a radio, or other processor associated with a system or systems on an aircraft. The processor communicates messages through a communication network with one or more destination receivers. The one or more destination receivers are in similar communication with multiple aircraft. Also, the destination receivers may be in communication with a network issue detector. The phrase "communication network" generally refers to a communication system that facilitates the transmission of information from an aircraft to a destination receiver and may consist of ground-based or orbital-based communication systems. For example, the communication networks may include ground communication systems, satellites that relay messages between aircraft and ground communication systems, and other aircraft that relay messages to ground communication systems. Further, a ground-based stakeholder may control or receive messages through the communication networks. For example, service providers connect to the ground communication systems and provide messages to the ground-based stakeholders. The ground-based stakeholders may include an original equipment manufacturer (OEM), an avionics manufacturer, airlines, the service providers, air traffic controllers, a government entity, or other party interested in receiving aircraft communications and/or the health of the communication links used for transmitting the communications.

During operation, a processor on an aircraft functions as part of an issue reporting system. The issue reporting system may be a CMU or other systems on the aircraft that can monitor multiple parameters regarding the status of the communication links between the aircraft and the destination receivers. When the issue reporting system is a CMU, the CMU may execute a communication management function (CMF) on an integrated platform along with other functions for monitoring the various parameters. For example, the monitored parameters may include status designations for the communication links, navigation parameters, identification for other connected communication systems, among other parameters that could provide information regarding the health of a prospective communication link, like contextual information (location, altitude, aircraft identification, etc.). In some embodiments, the issue reporting system may monitor health parameters indicative of the health status of the communication link to identify network events. When the health parameters indicate that the communication link has degraded or another type of network event of interest has occurred, the processor stores the network event information in a degraded link event report for transmission to a network issue detector through one of the available communication links. The network event information stored degraded link event report includes an indication of the degraded link event, a compilation of parameters monitored by the processor, and other contextual information from the perspective of an aircraft related to the communication link experiencing the degraded communications link event.

The network issue detector receives multiple degraded link event reports from multiple aircraft. As used herein, the network issue detector may refer to a system that analyzes the multiple degraded link event reports to identify systemic problems with communications between aircraft and the destination receivers. The network issue detector may be part of a destination receiver, a system controlled by a ground-based stakeholder, or a system located between one or more destination receivers and a ground-based stakeholder. The network issue detector analyzes the multiple degraded link event reports to identify systemic problems with a particular communication link.

FIG. 1 is a diagram illustrating multiple aircraft 101-1-101-2 in communication with multiple ground stations 111-1-111-3. As used herein, the aircraft 101-1-101-2 are referred to generally and collectively as aircraft 101. Similarly, the ground stations 111-1-111-3 are referred to generally and collectively as ground stations 111. The aircraft 101 communicates with the ground stations 111 through various communication links 107, 109, 113, 115, 117, and 121. As described herein, the aircraft 101 refers to an airborne vehicle, such that the aircraft 101 may be an airplane, helicopter, rocket, drone, or other vehicles capable of air travel, whether manned or autonomous. The ground stations 111 functions as examples of destination receivers for communications from the aircraft 101 through the communication links 107, 109, 113, 115, 117, and 121. Accordingly, the terms "ground stations" and "destination receivers" are interchangeable. Further, the term "ground station" is exemplary in nature, as a destination receiver may not necessarily be located on the ground. Further, the destination receiver may be an end system that communicates with the aircraft 101 through the ground stations 111.

In additional embodiments, the aircraft 101 may have multiple systems that communicate with the ground stations 111 through the various communication links. As described herein, the communication links include combinations of wireless radio communication links between the ground stations 111 and the aircraft 101. For example, communication links may include combinations of VHF radios, HF radios, satellite communications (both traditional safety datalink and Broadband datalink), Gatelink (Wi-Fi and Cell) communications, LDACS, AeroMacs, cellular, and other aviation-specific and civilian communication links.

In some exemplary embodiments, the different aircraft 101 may communicate with the same ground station 111. For example, the aircraft 101-1 may communicate with the ground station 111-2 through the communication link 109, and the aircraft 101-2 may communicate with the ground station 111-2 through the communication link 107. Alternatively, the aircraft 101 may communicate with different ground stations 111. For example, the aircraft 101-1 may communicate with the ground station 111-1 through the communication link 113, and the aircraft 101-2 may communicate with the ground station 111-2 through the communication link 107. Moreover, the aircraft 101 may communicate with different ground stations as the aircraft 101 fly. For example, the aircraft 101-1 may communicate with the ground station 111-1 and the ground station 111-2 at the same time, at different flight phases, or at different locations of the aircraft 101-1 during flight. Further, the aircraft 101 may communicate with each other to relay messages to a particular ground station 111. For example, the aircraft 101-2 may communicate with the aircraft 101-1 through the communication link 115, where the aircraft 101-1 then relays the received communications to the ground station 111-1 through the communication link 113.

In additional embodiments, the aircraft 101 may communicate with a ground station 111 using satellite communications. For example, the aircraft 101-2 may transmit messages to a satellite 119 through the communication link 117. Upon receiving the transmitted messages, the satellite 119 may relay the messages to the ground station 111-3 through the communication link 121. Further, a ground station 111 may function as a relay for communications from an aircraft 101. For example, the aircraft 101-1 may communicate with the ground station 111-1 through the communication link 113, where the ground station 111-1 then provides the messages to the ground station 111-2. In summation, the aircraft 101 may communicate with the ground stations 111 through various combinations of the communication links 107, 109, 113, 115, 117, and 121. Also, service providers 123 may facilitate communications through the communication links 107, 109, 113, 115, 117, and 121. As used herein, a service provider 123 refers to a third party that sends messages, receives messages, or both via the ground stations 111 and through the network issue detector 105. For example, a service provider may function as a central router between the aircraft 101 and the network issue detector 105 via the ground stations 111.

During communications between the aircraft 101 and the ground stations 111, the aircraft 101 can lose transmissions or receptions through one or more of the communication links 107, 109, 113, 115, 117, and 121. When communications are lost, the aircraft 101 may send a message to one or more of the ground stations 111 via the service provider 123 to a network, indicating that a link has been lost. Also, the aircraft 101 may indicate the ground station 111 associated with the lost communication. The aircraft 101 may send the message upon reestablishment of the link or through an alternate, available link. Also, the aircraft 101 may store information regarding the lost link or communication issue and transmit the information later (on the ground or after the occurrence of certain events that trigger transmission of the information) through an alternative link or upon reestablishment of the lost link. The message may indicate the type of event or transmit an indication of the event in a later message. The event indication may indicate that the link was lost, degraded, reestablished, or other types of communication events. Alternatively, the communications may become degraded through the communication links 107, 109, 113, 115, 117, and 121. In some instances of degraded communications, the ground stations 111 may receive broadcasts from the aircraft 101 but cannot transmit uplink messages. Additionally, some of the communication links 107, 109, 113, 115, 117, and 121 may be available but experience excessive utilization and/or noise such that the aircraft 101, while able to receive messages, cannot consistently transmit messages to the ground stations 111 or the messages are transmitted simultaneously with other aircraft messages transmitted to the ground stations 111. Frequently, the ground stations 111 and the aircraft 101 may lack the desired information for determining the cause of events such as the loss of communications, degraded link, or excessive utilization.

In some examples where ground stations 111 and the aircraft lack the desired information, the aircraft 101 may include computing systems that monitor various parameters regarding network communications while managing communications from the aircraft 101 through the communication links 107, 109, 113, 115, 117, and 121. For example, the computing system may be a communication management unit or other computing system that can monitor the communications to and from the aircraft 101. In some aircraft, the monitoring computing systems may maintain a record of the various parameters related to the status of the network communications. The monitoring computing system may provide this information to other computer systems through one or more of the ground stations 111 other than the network issue detector 105. The other computer system may then perform a retroactive analysis of the recorded parameters to examine the performance of the monitoring computing system and issues related to communications through one or more of the communication links 107, 109, 113, 115, 117, and 121. However, performing a typical retroactive analysis on information from a single airplane frequently cannot comprehend the desired context surrounding undesired network events, making it challenging to identify and rectify issues with the communication links 107, 109, 113, 115, 117, and 121. Also, the typical acquisition of the data frequently depends upon the physical retrieval of the information from the aircraft. When the monitoring computer system has a limited storage capacity, critical data can often be overwritten. Further, when retrieving data, technicians or mechanics may access trace logs stored on the aircraft. Coordinating the availability of the technicians/mechanics with aircraft turnaround time constraints can make the ordinary physical retrieval of the information difficult to support for aircraft operators and other interested parties.

An example of typical problems with acquiring information related to communication events may include lacking context surrounding events that occur due to the nature of the network. For example, typical information acquisition may lack information about a ground station communicating with a moving and potentially banking aircraft. Other issues may arise and occur frequently at certain locations, at certain times, or according to some other common problem that affects multiple aircraft or is systemic. For example, issues may arise due to aircraft relationships to ground stations 111, interference issues, congested network issues, objects in the way of transmission paths, and the like. Typical communications may lack contextual information that may help identify the systemic problems.

In certain embodiments, the aircraft 101 may include an issue reporting system to gather information related to the context surrounding communications. As used herein, the issue reporting system may be a computing system that monitors communication links 107, 109, 113, 115, 117, and 121 for network events and compiles the network event information into a degraded link event report. The issue reporting system then transmits degraded link event reports to a network issue detector 105 via one or more of the ground stations 111 and at least one service provider 123. The issue reporting system may be a communications management unit or other computing system located on the aircraft 111. Upon reception of a degraded link event report from the aircraft 101, the network issue detector 105 may analyze the degraded link event reports. The network issue detector 105 may be located as part of a ground station 111, on a computing system controlled by a service provider, a computing system controlled by a ground-based stakeholder, or on a stand-alone computing system accessible by interested parties.

In some embodiments, the issue reporting system automatically sends the degraded link event reports to the network issue detector 105, or the issue reporting system sends the degraded link event reports in response to a request from the network issue detector 105. When the issue reporting system automatically sends the degraded link event report to the network issue detector 105, the monitoring computing system may automatically send the degraded link event report after the passage of a specific time period, upon experiencing a communication triggering event, or after experiencing a report triggering event. Examples of communication triggering events may include the loss of communications, degradation of communications below a measurable threshold, the resumption of communications through one of the communication links 107, 109, 113, 115, 117, and 121, or other type of triggering events. Examples of report triggering events may include the end of a flight, the beginning of a flight, the collection of a defined number of events, the collection of a defined amount of data, a connection to a particular communication link associated with the network issue detector 105, or other events that can direct the issue reporting system to provide the degraded link event report to the network issue detector 105.

In some embodiments, when the issue reporting system experiences the loss of communications through one of the communication links 107, 109, 113, 115, 117, and 121, the issue reporting system may send the degraded link event report through a different communication link. For example, if the aircraft 101-1 is communicating through the communication link 109 and experiences degraded communications through the communication link 109, the issue reporting system on the aircraft 101-1 may transmit the degraded link event report through one of the other available communication links 107, 113, 115, 117, and 121 to provide the degraded link event report to the network issue detector 105.

Upon receiving degraded link event reports from multiple aircraft, the network issue detector 105, controlled by an interested stakeholder, may analyze the information in the degraded link event reports to identify systemic problems experienced by one or more of the communication links 107, 109, 113, 115, 117, and 121. As referred to herein, a systemic problem refers to a problem that affects a communication link between an aircraft 101 and a ground station 111. For example, systemic problems may be associated with one or more of the following: a geographic location, altitude, phase of flight, time of day, communication equipment used, air traffic conditions, service provider, link network congestion, weather conditions, aircraft type, operator, or other factors that might affect transmission between the aircraft 101 and the ground stations 111. Once a ground-based stakeholder identifies a systemic problem, the ground-based stakeholder can use the contextual information to investigate, characterize, and/or rectify the systemic problem.

Figure 2:
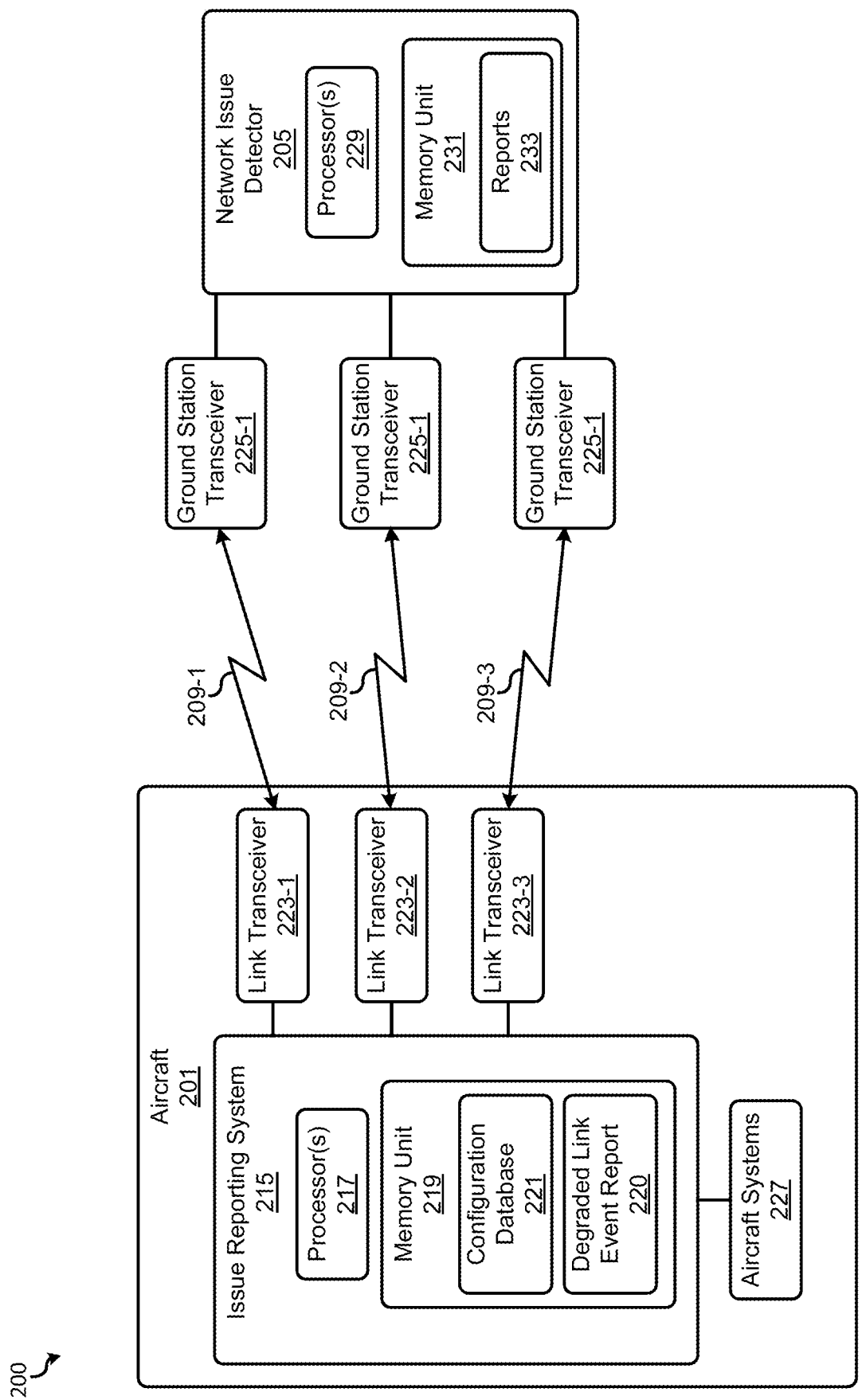
FIG. 2 is a block diagram illustrating a system for facilitating communications between an aircraft and a communications network across multiple communication links according to an aspect of the present disclosure.

FIG. 2 is a block diagram of a system 200 that can identify systemic problems in communicating over communication links. As illustrated, the system 200 includes an aircraft 201 and a network issue detector 205. The aircraft 201 communicates with the network issue detector 205 through the communication links 209-1-209-3 (the communication links 209-1-209-3 are referred to herein either collectively or generally as communication link(s) 209). The communication links 209 may function similarly to the communication links 107, 109, 113, 115, 117, and 121 described above in FIG. 1. Additionally, the aircraft 201 may function substantially as described above concerning the aircraft 101 in FIG. 1, and the network issue detector 205 may function substantially as described above concerning the network issue detector 105.

In some embodiments, the aircraft 201 may communicate through the communication links 209 by emitting a signal through associated link transceivers 223-1-223-3. Similarly, the network issue detector 205 may communicate through the communication links 209 by providing communications to a service provider or providing the communications to a ground station transceiver 225 for transmission through an associated ground station transceivers 225-1-225-3. The individual link transceivers 223 and ground station transceivers 225 may be associated with different communication links 209. In some implementations, when the ground station transceivers 225 are coupled to service providers (like the service provider 123), where the service providers link to operation centers, ATC centers, and, in embodiments described herein, a network issue detector 205 (which may be part of an operation center, ATC center, or other system in communication with the service provider.

In further embodiments, the aircraft 201 includes an issue reporting system 215 that monitors the communications through the links 209. Additionally, the issue reporting system 215 may be part of a system that manages communications through the links 209. For example, the issue reporting system 215 may be a communication management unit or other type of computing system that can manage or monitor communications through the links 209. Additionally, in some implementations, the issue reporting system 215 is coupled to one or more additional aircraft systems 227. The issue reporting system 215 may monitor communications through the communication links 209 from the one or more additional aircraft systems 227. For example, the one or more additional aircraft systems 227 may include navigation systems, entertainment systems, sensing systems, pilot communication systems, among other systems that may operate on an aircraft 201.

In some embodiments, the issue reporting system 215 includes one or more processors 217 and a memory unit 219. The issue reporting system 215 uses the one or more processors 217 and the memory unit 219 to execute portions of the methods described in the present disclosure to compile and store network event information. For example, the one or more processors 217 and/or other computational devices used within the system 200 may be implemented using software, firmware, hardware, or an appropriate combination thereof. The one or more processors 217 and other computational devices may be supplemented by, or incorporated in, specially designed application-specific integrated circuits (ASICs) or field programmable gate arrays (FPGAs). The one or more processors 217 and other computational devices can also include or function with software programs, firmware, or other computer-readable instructions for carrying out various process tasks, calculations, and control functions used in the methods and systems described herein.

The methods described herein may be implemented or controlled by computer-executable instructions, such as program modules or components, executed by at least the one or more processors 217 or other computing devices. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein may be implemented in software, firmware, or other computer-readable instructions. These instructions are typically stored on appropriate computer program products that include computer-readable media used to store computer-readable instructions or data structures. For example, the memory unit 219 may be computer-readable media that stores computer-readable instructions or data structures. Such a computer-readable medium may be available media that can be accessed by a general-purpose or special-purpose computer or processor, or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can carry or store desired program code as computer-executable instructions or data structures. The memory unit 219 facilitates gathering information by the one or more processors 217 by storing information in a degraded link event report 220 and a configuration database 221.

In certain embodiments, the one or more processors 217 monitors multiple parameters regarding network and link status for the compilation of network event information. The one or more processors 217 stores the network event information related to the monitored parameters in the degraded link event report 220. Additionally, the one or more processors 217 creates the degraded link event report 220 and provides the degraded link event report 220 as directed by information stored in the configuration database 221. The one or more processors 217 may provide the degraded link event report 220 to the network issue detector 205. In some implementations, the one or more processors 217 provides the degraded link event report 220 to the network issue detector 205 automatically or upon request from the network issue detector 205.

When automatically transmitting, the one or more processors 217 may periodically transmit a degraded link event report 220 to the network issue detector 205. When the one or more onboard processors 217 periodically transmit a degraded link event report 220 to the network issue detector 205, the configuration database 221 may define a frequency at which degraded link event reports 220 are transmitted to the network issue detector 205. The network issue detector 205, other computing systems, or configuration devices may communicate with the one or more processors 217 to change the transmission frequency stored in the configuration database 221, either before, after, or during a flight. Alternatively, the one or more processors 217 automatically transmits degraded link event reports 220 to the network issue detector 205 in response to certain triggering events. Triggering events may be communication triggering events or be report triggering events. Communication triggering events may be related to the monitored communications and may include the loss of communications through one of the communication links 209, the surpassing of a threshold by a particular monitored parameter, the resumption of communications through one of the communication links 209, being at a particular geographic location, operating at a certain time of day, or other triggering event. In some implementations, report triggering events may be events related to information that describes the report or reporting process and may include the end of a flight, the beginning of a flight, particular phases of flight, the collection of a defined number of events, the collection of a defined amount of data, a connection to a particular communication link associated with the network issue detector 205, or other events related to the degraded link event reports 220. Other examples of report triggering events may include independent events from the report or reporting process and also independent from the communication triggering events. For example, report triggering events may also include landing at a certain airport, receiving an uplink request, the passage of a certain number of times, completing or beginning a certain number of flights, and the like. The configuration database 221 may store a list of different triggering events. Additionally, the network issue detector 205, or other devices, may send information to the aircraft that defines a list of different triggering events through one of the communication links 209. The issue reporting system 215 may store the received event defining information in the configuration database 221.

In some embodiments, the configuration database 221 may also specify the device having the network issue detector 205. For example, the configuration database 221 may specify that the network issue detector 205 is part of a computing system controlled by ground-based stakeholders. Also, the configuration database 221 may specify that the network issue detector 205 is part of a ground station or a stand-alone device. By specifying the device having the network issue detector 205, the configuration database also specifies the recipients of transmissions of the degraded link event reports 220. Additionally, the configuration database 221 may define parameters that interest other ground-based stakeholders. Accordingly, the one or more processors 217 may automatically transmit a degraded link event report 220 containing desired information to a particular ground-based stakeholder associated with the network issue detector 205 specified in the configuration database 221.

In addition to acquiring the degraded link event reports 220 automatically from the aircraft 201, the network issue detector 205 may acquire degraded link event reports 220 as desired by the network issue detector 205 or ground-based stakeholders that control the network issue detector 205. For example, the one or more processors 217 may transmit the degraded link event reports 220 to the network issue detector 205 in response to receiving a request for the degraded link event reports 220 from the network issue detector 205.

In addition to storing when and how to transmit the monitored parameters, the configuration database 221 may define when information is stored within the degraded link event report 220 and what information is stored within a degraded link event report 220. For example, the configuration database 221 may define that the one or more processors 217 stores monitored parameters in the degraded link event report 220 periodically (or associated with the particular event), or the configuration database 221 defines triggering events for storing monitored parameters in the degraded link event report 220.

When the configuration database 221 defines triggering events for storing parameters in the degraded link event report 220, the triggering events may be similar to the communication triggering events described above concerning when the one or more processors 217 transmits a degraded link event report 220 to the network issue detector 205. For example, the triggering events for storing parameters in the degraded link event report 220 may include the loss of communications through one of the communication links 209, the surpassing of a threshold by a particular monitored parameter, the resumption of communications through one of the communication links 209, being at a particular geographic location, operating at a certain time of day, or other triggering event. Additionally, the configuration database 221 may associate different sets of parameters with different triggering events. For example, if one triggering event occurs, the one or more processors 217 may identify the event in the degraded link event reports 220 and store parameters associated with the triggering event in the degraded link event report 220 as defined in the configuration database 221. If a different triggering event occurs, the one or more processors 217 may store different parameters in the degraded link event report 220 that are associated with the different triggering events as defined in the configuration database 221. Further, the degraded link event report 220 may store parameters at the time an event occurs, when a triggering event occurs, or both.

In certain embodiments, the one or more processors 217 may store data in the degraded link event report 220 that conveys information about the communications between the aircraft 201 and an end system or destination receiver (i.e., air traffic controller, airline operations, etc.) through one of the communication links. Also, the one or more processors may store data about the state of the aircraft 201 when communication events occur in the degraded link event report 220. Additionally, the one or more processors 217 may store data about events experienced by the one or more processors 217. Moreover, the one or more processors 217 may store data that implies events experienced by the one or more processors 217.

In some embodiments, the one or more processors 217 stores statistical information related to loss of communications through one or more of the communication links 209. For example, when the one or more processors 217 loses communications through a communication link 209, the one or more processors 217 may increment a counter in the degraded link event report 220. The counter indicates how many times communications have been lost through a communication link 209. Also, the one or more processors 217 may store a duration for which communications were lost through a communication link 209. Additionally, the one or more processors 217 may store the position and altitude at which communications were lost and the time that communications were lost through a communication link 209.

In additional embodiments, the one or more processors 217 may store information related to lost communications in the degraded link event report 220. For example, when the aircraft loses communications through a communication link 209 with a destination receiver on the ground, such as loss of communication with an air traffic control center, the one or more processors 217 may store the time and location of the aircraft 201 of the communications loss through the communication link 209. Specifically, regarding aeronautical telecommunications network (ATN) air traffic control (ATC) centers, the one or more processors 217 may record the loss of communications with an ATN ATC center as a provider abort.

In further embodiments, the network issue detector 205 may be an air traffic controller, and the one or more processors 217 may store information related to communications with the air traffic controller in the degraded link event report 220. For example, the one or more processors 217 may record whether the air traffic controller is a Future Air Navigation System (FANS) air traffic controller or an ATN ATC. Additionally, the one or more processors 217 may store information about failed logons in the degraded link event report 220. The information about the failed logons may include whether the air traffic controller is a FANS or ATN ATC, the region of the ATC center, the time of the failed logon, and the location of where the failed login occurred. Additionally, the one or more processors 217 may store the current data authority and the next data authority in the degraded link event report 220.

In some embodiments, the one or more processors 217 may store information concerning issues that arise in communications between a destination receiver and the aircraft 201. For example, when the one or more processors 217 receive an incomplete or invalid uplink from a destination receiver, the one or more processors 217 may increment an incomplete uplink counter in the degraded link event report 220. Similarly, when the one or more processors 217 receive a corrupted uplink from a destination receiver, the one or more processors 217 may increment a corrupted uplink counter in the degraded link event report 220. Additionally, the one or more processors 217 may store information received through an uplink from a destination receiver. For example, the one or more processors 217 may expect to receive a series of packets in a specific sequence. For instance, the packets may include information identifying the number of a particular packet. At times, the one or more processors 217 may receive packets out of sequence. When the one or more processors 217 receive the out of sequence packets, the one or more processors 217 may store information in the degraded link event report 220 identifying the numbers of the out-of-sequence packets, and, also, the one or more processors 217 may store information in the degraded link event report 220 about the sequence of the out-of-order packets.

Additionally, the one or more processors 217 may store information about lost packets in the degraded link event report 220. For example, when the one or more processors 217 determines that a packet was lost, the one or more processors 217 may increment a lost packet counter in the degraded link event report 220 for the particular communication link 209. Additionally, as some systems may have multiple layers in a communication protocol stack, the degraded link event report 220 may include multiple lost packet counters, where each packet counter is associated with a different type of packet or layer. Further, the one or more processors 217 may maintain a lost packet identifier list in the degraded link event report 220, where the lost packet identifier list contains a list of expected identifiers for expected packets that were not received by the one or more processors 217.

In additional embodiments, the one or more processors 217 may store information related to the quality of the communication link 209. For example, the one or more processors 217 may store information about message latency in the degraded link event report 220. To acquire information about message latency, the one or more processors 217 may track the time between transmission of a downlink and the reception of an acknowledgment from a ground station or other ground system (like an ATC center or operations center). For example, the one or more processors 217 may store timestamp values for when a message is transmitted and received along with the current time. Moreover, the one or more processors 217 may store information related to the signal strength of the communication link 209 between the ground stations and the aircraft 201. For example, the one or more processors 217 may periodically store the signal strength, or store measurements of signal strength in the degraded link event report 220 upon the occurrence of a triggering event. Additionally, the one or more processors 217 may store measurements of channel utilization in the degraded link event report 220 for a particular communication link 209. Again, the one or more processors 217 may store the channel utilization measurements periodically or upon the occurrence of a triggering event.

In some embodiments, the one or more processors 217 may store information describing the physical relationship of the aircraft 201 (or communication equipment on the aircraft 201) to a ground station in the degraded link event report 220. For example, the one or more processors 217 may store information describing the physical distance between a connected ground station and the aircraft 201 and the orientation (in-front, behind, underneath, off to the side, etc.) of the aircraft 201 in relation to the ground station in the degraded link event report 220. Additionally, the one or more processors 217 may store information about the bank angle of the aircraft 201 in the degraded link event report 220. For example, as the aircraft 201 turns or banks, portions of the body of the aircraft 201 may interfere with the line of sight between communication apparatus on the aircraft 201 and the ground station. Thus, either automatically or upon a triggering event, the one or more processors 217 may store the bank angle of the aircraft 201 in the degraded link event report 220. Further, to help determine whether the body of the aircraft 201 interferes with a communication link 209, the one or more processors 217 may also store information describing the location of antennas associated with the communication links 209 in the degraded link event report 220. Moreover, the one or more processors 217 may store information related to the velocity of the aircraft 201 in relation to a ground station in the degraded link event report 220. For example, the speed of the aircraft 201 relative to the ground station may lead to degradation of communications through the communication links 209 because of Doppler effects.

In further embodiments, the one or more processors 217 may increment a retransmission counter when the one or more processors 217 retransmits a message to a destination receiver through a ground station. For example, the one or more processors 217 may transmit a message to a destination receiver through a ground station. If the one or more processors 217 fails to receive an acknowledgment from the destination receiver for the transmitted message, the one or more processors 217 may retransmit the message. The one or more processors 217 may increment the retransmission counter when the message is retransmitted to the destination receiver. In some implementations, the degraded link event report 220 may include a separate retransmission counter for each of the retransmitted messages along with an identifier of the retransmitted messages. Also, the degraded link event report 220 may include a total retransmission counter that is incremented when any message is retransmitted, a counter for the number of messages that were retransmitted a maximum number of times, along with a counter for the number of timers that expired waiting for the reception of acknowledgments from destination receivers. In additional implementations, the one or more processors 217 may transmit the degraded link event report 220 to the network issue detector 205 as part of retransmitting the message to a destination receiver (or other network entity in a communication network.

In some embodiments, the degraded link event report 220 may include information about the operational health of equipment used to facilitate communications through the communication links 209. For example, the one or more processors 217 may monitor the health of a VHF radio or other communication radio. The one or more processors 217 may record whether a communication link 209 that has failed did so because the VHF radio experienced a system reset, a fault, or a failure on the aircraft. Additionally, the one or more processors 217 may also store information regarding the health of a CMU performing management tasks along with executing the functions of the issue reporting system 215. For example, when the issue reporting system 215 is executed by a CMU, the one or more processors 217 may store information about the health of the CMU. The health of the CMU may include CMU resets, faults, failures, or other events directly or indirectly related to the health of the CMU.

In some situations, the communication link 209 between the aircraft 201 and a destination receiver may be handed off between ground station transceivers 225 and different communication links (like VHF and SATCOM). For example, when the aircraft 201 moves from traveling over land to traveling over an ocean, one of the ground station transceivers 225 may handoff communications to another ground station transceiver 225. Also, the different ground station transceivers 225 may be associated with different regions, and the communications may be passed between different ground station transceivers 225 as the aircraft 201 travels from one region to another. Additionally, the different ground station transceivers 225 may be associated with different types of communication links 209 (like SATCOM, VHF, HF, and the like), and the communications may be passed between different ground station transceivers 225 or communication link types when the communications are passed to other types of communication links 209. When communications are transferred between different communication links 209, individual link transceivers 223, or different ground station transceivers 225, the one or more processors 217 may store information related to these handoffs in the degraded link event report 220.

In certain embodiments, the information related to the handoffs may include identifiers for the service providers associated with the handoff and identifiers for the ground antennas (or satellites) associated with the handoff. Additionally, the information may describe the location (altitude, attitude, latitude, longitude, etc.) where the handoff occurred, the frequency with which the handoff occurred, and the duration of the handoff. For example, when collecting information about a handoff, the one or more processors 217 may initiate a timer for the handoff and record the time when the handoff completes. In a further example, when the handoff is between a VHF communication link 209 and a SATCOM communication link 209 or vice versa, the one or more processors 217 may initiate a timer. If the timer expires, the one or more processors 217 may record the expired timer (such as Routing Airborne Timer 1 (RAT1) expiration) in the degraded link event report 220.

In additional embodiments, the one or more processors 217 may store statistics information for the different communication links 209 between the aircraft 201 and destination receivers through the ground stations in the degraded link event report 220. For example, the one or more processors 217 may store a connection table, such as a peer entity connection table, which includes information about the connection status. In particular, the connection table may store information about the connection status of VHF radios and ground stations associated with a destination receiver. Additionally, the one or more processors 217 may increment a counter in the degraded link event report 220 when a message is sent or received between aircraft 201 and a destination receiver. For example, the degraded link event report 220 may have a sent message counter and a received message counter, where the one or more processors 217 increments the sent message counter when a message is sent from the aircraft 201 to destination receiver, and the one or more processors 217 increments the received message counter when a message from the destination receiver is received by the aircraft 201. Further, the one or more processors 217 may store the length of connections through a particular communication link 209 and the frequency with which communications have switched between different communication links 209.

As described above, the one or more processors 217 transmits the degraded link event report 220 to the network issue detector 205 as requested by the network issue detector 205 or upon the occurrence of a monitored event. The network issue detector 205 communicates with multiple aircraft 201 and receives the separate degraded link event reports 220 from the various aircraft 201. As illustrated, the network issue detector 205 may also include one or more network issue detector processors 229. The network issue detector processors 229 may control and monitor communications through the communication links 209 with various aircraft 201. Additionally, the network issue detector processors 229 store received degraded link event report 220 from the aircraft 201 as reports 233 on a memory unit 231. The network issue detector processors 229 and the memory unit 231 may function in a similar manner as described above concerning the one or more processors 217 and the memory unit 219.

In certain embodiments, upon receiving multiple degraded link event reports 220 from multiple aircraft 201, the network issue detector processors 229 may analyze the data in the reports 233 to identify systemic degraded data link network problems with the communication links 209. As used herein, a systemic degraded data link network problem may refer to a network problem that negatively impacts systems that facilitate communications between aircraft 201 and destination receivers through the ground stations and communication links 209. Further, a degraded data link network problem may be a network problem that affects communications between multiple aircraft 201 and one or more destination receivers. Degraded data link network problems may be common with the communication software or hardware on the aircraft 201. Additionally, degraded data link network problems may include hardware or software problems with the equipment that relays messages between aircraft 201 and associated destination receivers. Further, the degraded data link network problems may include problems associated with a particular geographic location. Also, degraded data link network problems may be associated with communication hardware or software at the destination receiver.

In certain embodiments, the network issue detector 205 analyzes the compiled network information in the reports 233 to identify the context around degradations of communications through the communication links 209. As used herein, the context around a degradation refers to information representing the state of the aircraft 201, communication facilities that support the communication links 209, and the destination receiver when communication degradations occur. Using reports 233 from multiple aircraft 201, the network issue detector processors 229 may identify context related to directly measurable communication events (events that generate data that are directly related to communications, such as failure of communication facilities) and implied communication events (events that generate data that are indirectly related to communications, such as the location of the aircraft). The network issue detector 205 can use the identified context around the failures to identify systemic degraded data link network problems for the communication links 209 that have occurred in the past, are presently affecting the communication links 209, or that may affect the communication links 209 in the future.

In some embodiments, the network issue detector 205 identifies systemic problems from the data stored in the reports 233. In particular, the network issue detector 205 may analyze the reports 233 for past degraded links experienced, problems currently being experienced, and problems that could potentially be experienced by at least one aircraft 201 in communication with the network issue detector 205. When identifying past, present, or potential future problems, the network issue detector 205 may review the reports 233 for indications of degraded link data. The indications of degraded link data may include data transmitted in a degraded link event report 220 that are outside a desired operating range. After identifying indications of degraded link data, the network issue detector 205 may further analyze the data from multiple aircraft 201 to determine whether the identified indication is specific to one aircraft 201 or multiple aircraft 201. If the indication applies to multiple aircraft, the network issue detector 205 may determine that there is a systemic problem. When a systemic problem has been identified, the network issue detector 205 may also analyze the reports 233 to identify the cause of the systemic problem. In an additional implementation, the network issue detector processors 229 may compare the recently acquired data against previously acquired data in the reports associated with systemic problems. For example, the network issue detector processors 229 may compare the recently acquired data by looking for similar data in the recently acquired data or by implementing machine learning algorithms trained by the previously acquired data.

Figure 3:
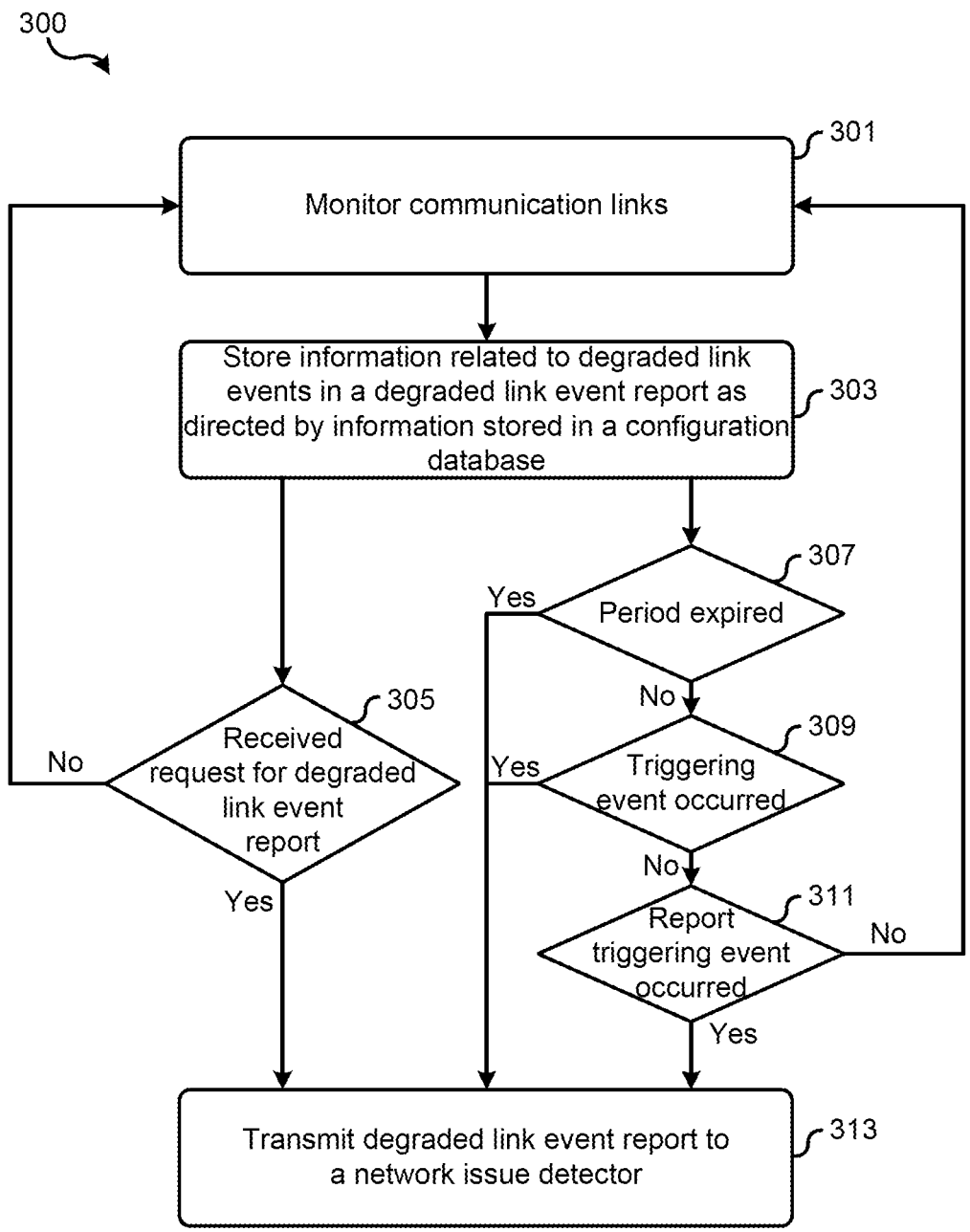
FIG. 3 is a flow diagram of a method for creating and transmitting degraded link event reports according to an aspect of the present disclosure.

Referring to the components described in FIG. 2, FIG. 3 is a flow diagram of a method 300 for creating degraded link event reports by an issue reporting system 215 and transmitting the degraded link event reports to a network issue detector 205. The method 300 proceeds at 301, where communication links 209 are monitored. For example, the issue reporting system 215 may monitor the operation of the communications from the aircraft 201 through one or more communication links 209. The method 300 then proceeds at 303, where information related to degraded link events is stored in a degraded link event report 220 as directed by information in a configuration database 221.

In some embodiments, when the information is stored in the degraded link event report 220, the method 300 proceeds to determine whether to transmit the degraded link event report 220 to a network issue detector 205. To determine whether to transmit the degraded link event report 220, the method 300 may proceed to 305, where the issue reporting system 215 determines whether a request for the degraded link event report 220 has been received from the network issue detector 205. If a request has been received, the method 300 proceeds to 313, where the degraded link event report 220 is transmitted to the network issue detector 205. If a request has not been received, the method 300 may return to 301 for continued monitoring of the communication links 209.

In further embodiments, the method 300 may determine whether to automatically transmit the degraded link event report 220 to the network issue detector 205. To determine whether to automatically transmit the degraded link event report 220, the method 300 may proceed to 307, where the issue reporting system 215 determines whether a time period has expired. If the time period has expired, the method 300 proceed to 313, where the degraded link event report 220 is transmitted to the network issue detector 205. If the time period has not expired, the method 300 may proceed to 309, where the issue reporting system 215 determines whether a communication triggering event has occurred. If a communication triggering event has occurred, the method 300 proceeds to 313, where the degraded link event report 220 is transmitted to the network issue detector 205. If a communication triggering event has not occurred, the method 300 proceeds to 311, where the issue reporting system 215 determines whether a report triggering event has occurred. If a report triggering event has occurred, the method 300 proceeds to 313, where the degraded link event report 220 is transmitted to the network issue detector 205. If a report triggering event has not occurred, the method 300 proceeds to 301 for continued monitoring of the communication links 209. While the method 300 shows the detection of time period expiration, communication triggering events, and report triggering events being performed serially, the method 300 may also perform the detection of time period expiration, communication triggering events, and report triggering events in parallel.

Figure 4:
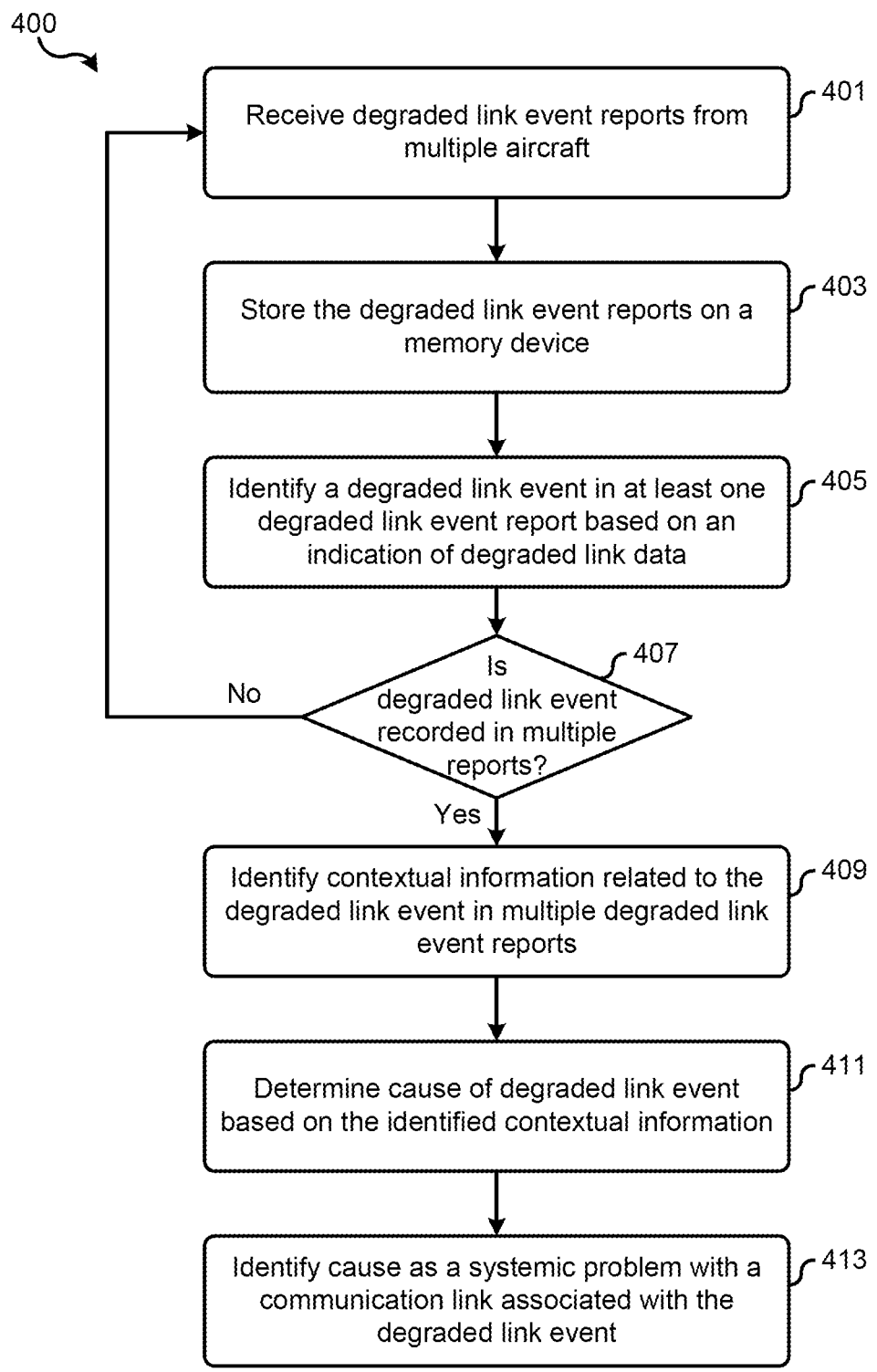
FIG. 4 is a flow diagram of a method for processing degraded link event reports from multiple aircraft according to an aspect of the present disclosure.

Referring to the components described in FIG. 2, FIG. 4 is a flow diagram of a method 400 for processing degraded link event reports 233 received from multiple aircraft 201 by a network issue detector 205. The method 400 proceeds at 401, where the network issue detector 205 receives degraded link event reports from multiple aircraft. Also, the network issue detector 205 may receive multiple degraded link event reports from the same aircraft. For example, the network issue detector 205 may receive multiple degraded link event reports from the multiple aircraft 201 through one or more of the communication links 209. Further, the method 400 proceeds at 403, where the network issue detector 205 stores the degraded link event reports on a memory device. For instance, the network issue detector 205 may store the received degraded link event reports in the reports 233 on the memory unit 231.

In certain embodiments, the method 400 may proceed at 405, where the network issue detector 205 identifies a degraded link event in at least one degraded link event report based on an indication of degraded link data. For example, the network issue detector processor 233 may analyze the data stored in the reports 233 to identify degraded link events. Degraded link data is data that indicates loss of communication through a communication link or that measurable parameters associated with a communication link were outside of a desired operational range. When the network issue detector processor 229 identifies a degraded link event, the method 400 may proceed at 407, where the network issue detector 205 determines if the degraded link event is recorded in multiple reports. For example, the network issue detector processor 229 may analyze the multiple reports 233 for similar degraded link events. If the network issue detector processor 229 does not find the degraded link event recorded in more than one degraded link event report, then the method 400 returns to 401, where the network issue detector 205 continues to receive degraded link event reports from multiple aircraft. Alternatively, the network issue detector 205 may identify the degraded link event as a specific problem for the aircraft that provided the degraded link event report.

In exemplary embodiments, when the degraded link event is recorded in multiple reports, the method 400 may proceed at 409, where the network issue detector 205 identifies contextual information related to the degraded link event in the multiple degraded link event reports. For example, the network issue detector processor 229 may analyze the degraded link event reports 233 for information related to the context of the degraded link event. Further, the method 400 may proceed at 411, where the network issue detector 205 determines the cause of the degraded link event or a systemic issue with a communication link 209 based on the identified contextual information. Additionally, the method 400 may proceed at 413, where the network issue detector 205 identifies the cause as a systemic problem with a communication link associated with the degraded link event. When a systemic problem is identified, a ground-based stakeholder can use the information to rectify the systemic problem or deal with the systemic problem as desired.

Figure 5:
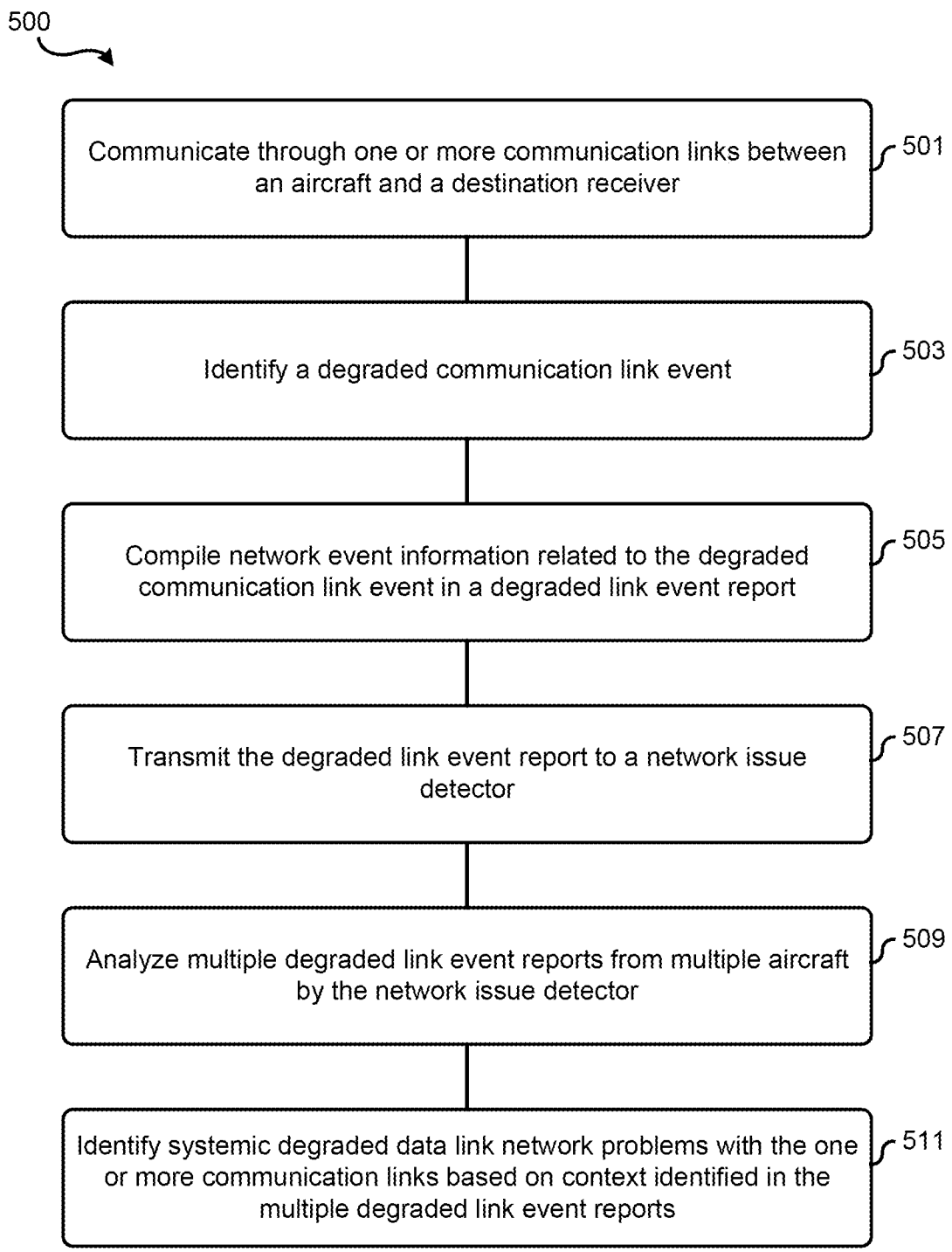
FIG. 5 is a flow diagram of a method for identifying systemic problems for communication links between multiple aircraft and a destination receiver according to an aspect of the present disclosure.

FIG. 5 is a flow diagram of a method 500 for identifying systemic problems for communication links between aircraft and a destination receiver, such as a ground station. The method 500 proceeds at 501, where an aircraft and a destination receiver communicate through one or more communication links. Further, the method 500 proceeds at 503, where a degraded communication link event is identified. Moreover, the method 500 proceeds at 505, where network event information related to the degraded communication link event is compiled in a degraded link event report.

In additional embodiments, the method 500 proceeds at 507, where the degraded link event report is transmitted to a network issue detector. Additionally, the method 500 proceeds at 509, where multiple degraded link event reports are analyzed from multiple aircraft by the network issue detector. Also, the method 500 proceeds at 511, where systemic degraded data link network problems with the one or more communication links are identified based on context identified in the multiple degraded link event reports.

EXAMPLE EMBODIMENTS

Example 1 includes a system comprising: a network issue detector configured to receive degraded link event reports from the multiple aircraft through one or more data communication links, wherein each of the multiple aircraft comprises one or more aircraft processors that compile network event information related to degraded communication link events in a degraded link event report, wherein the degraded link event report describes context surrounding the degraded communication link events from a perspective of an aircraft in the multiple aircraft, wherein the network issue detector comprises one or more network issue detector processors that identify systemic degraded data link network problems with the one or more data communication links for time and location based on the context identified in the degraded link event reports.

Example 2 includes the system of Example 1, wherein the one or more aircraft processors are part of a communication management unit.

Example 3 includes the system of any of Examples 1-2, wherein the network issue detector receives the degraded link event report from the aircraft in response to sending a request for the degraded link event report from the network issue detector.

Example 4 includes the system of any of Examples 1-3, wherein the network issue detector receives the degraded link event report from the aircraft that was automatically sent by the aircraft.

Example 5 includes the system of Example 4, wherein the aircraft automatically sends the degraded link event report to the network issue detector after at least one of: expiration of a period; occurrence of a communication triggering event; and occurrence of a report triggering event.

Example 6 includes the system of Example 5, wherein the communication triggering event includes at least one of: communication loss through the one or more data communication links; communication degradation through the one or more data communication links below a measurable threshold; and communication resumption through the one or more data communication links after the communication loss.

Example 7 includes the system of any of Examples 1-6, wherein the network issue detector sends instructions to the aircraft that direct compilation of the network event information by the one or more aircraft processors according to the instructions stored in a configuration database stored on the aircraft.

Example 8 includes the system of Example 7, wherein the aircraft stores the instructions in the configuration database.

Example 9 includes the system of any of Examples 7-8, wherein the instructions specify the network issue detector as a recipient for a transmission of the degraded link event report.

Example 10 includes the system of any of Examples 1-9, wherein the degraded link event report keeps at least one of: statistical information related to the communications through the one or more data communication links; identified issues that arise during the communications through the one or more data communication links; information related to quality of the communications through the one or more data communication links; data describing a physical relationship of the aircraft in the multiple aircraft to a destination communicating with the aircraft through the one or more data communication links; health information for equipment on the aircraft; and handoff information.

Example 11. A method comprising: communicating through one or more communication links between an aircraft and a destination receiver; identifying a degraded communication link event; compiling network event information related to the degraded communication link event in a degraded link event report; transmitting the degraded link event report to a network issue detector; analyzing multiple degraded link event reports from multiple aircraft by the network issue detector; and identifying systemic degraded data link network problems with the one or more communication links based on context identified in the multiple degraded link event reports.

Example 12 includes the method of Example 11, wherein transmitting the degraded link event report to the network issue detector comprises transmitting the degraded link event report in response to a request for the degraded link event report from the network issue detector.

Example 13 includes the method of any of Examples 11-12, wherein transmitting the degraded link event report to the network issue detector comprises automatically transmitting the degraded link event report to the network issue detector.

Example 14 includes the method of Example 13, wherein automatically transmitting the degraded link event report to the network issue detector comprises transmitting the degraded link event report to the network issue detector after at least one of: expiration of a period; occurrence of a communication triggering event; and occurrence of a report triggering event.

Example 15 includes the method of Example 14, wherein the communication triggering event includes at least one of: communication loss through the one or more communication links; communication degradation through the one or more communication links below a measurable threshold; and resumption of communications through the one or more communication links.

Example 16 includes the method of any of Examples 11-15, wherein compiling the network event information related to the degraded communication link event further comprises compiling the network event information as specified by instructions in a configuration database stored on the aircraft.

Example 17 includes the method of Example 16, further comprising configuring the instructions stored in the configuration database as directed by the network issue detector.

Example 18 includes the method of any of Examples 16-17, wherein the configuration database specifies the network issue detector as a recipient for a transmission of the degraded link event report.

Example 19 includes a system comprising: a plurality of aircraft, wherein an aircraft in the plurality of aircraft communicates through one or more communication links, the aircraft comprising: one or more processors that compile network event information related to degraded communication link events; and one or more memory units that store a degraded link event report and a configuration database, wherein the degraded link event report stores the compiled network event information related to the degraded communication link events as directed by information in the configuration database; and a network issue detector in communication with the plurality of aircraft, wherein the network issue detector receives degraded link event reports from the plurality of aircraft, wherein the network issue detector comprises one or more network issue detector processors that identify systemic degraded data link network problems with the one or more communication links based on context identified in the degraded link event reports.

Example 20 includes the system of Example 19, wherein the aircraft sends a respective degraded link event report to the network issue detector in response to a request for the degraded link event report from the network issue detector.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   a network issue detector configured to receive degraded link event reports from multiple aircraft through one or more data communication links, wherein each of the multiple aircraft comprises one or more aircraft processors that compile network event information related to degraded communication link events in a degraded link event report, wherein the degraded link event report describes context surrounding the degraded communication link events from a perspective of an aircraft in the multiple aircraft, wherein the network issue detector comprises:
   one or more network issue detector processors that identify systemic degraded data link network problems with the one or more data communication links for time and location based on the context identified in the degraded link event reports.

2. The system of claim 1, wherein the one or more aircraft processors are part of a communication management unit.

3. The system of claim 1, wherein the network issue detector receives the degraded link event report from the aircraft in response to sending a request for the degraded link event report from the network issue detector.

4. The system of claim 1, wherein the network issue detector receives the degraded link event report from the aircraft that was automatically sent by the aircraft.

5. The system of claim 4, wherein the aircraft automatically sends the degraded link event report to the network issue detector after at least one of:
   expiration of a period;
   occurrence of a communication triggering event; and
   occurrence of a report triggering event.

6. The system of claim 5, wherein the communication triggering event includes at least one of:
   communication loss through the one or more data communication links;
   communication degradation through the one or more data communication links below a measurable threshold; and
   communication resumption through the one or more data communication links after the communication loss.

7. The system of claim 1, wherein the network issue detector sends instructions to the aircraft that direct compilation of the network event information by the one or more aircraft processors according to the instructions stored in a configuration database stored on the aircraft.

8. The system of claim 7, wherein the aircraft stores the instructions in the configuration database.

9. The system of claim 7, wherein the instructions specify the network issue detector as a recipient for a transmission of the degraded link event report.

10. The system of claim 1, wherein the degraded link event report keeps at least one of:

statistical information related to the communications through the one or more data communication links;
identified issues that arise during the communications through the one or more data communication links;
information related to quality of the communications through the one or more data communication links;
data describing a physical relationship of the aircraft in the multiple aircraft to a destination communicating with the aircraft through the one or more data communication links;
health information for equipment on the aircraft; and
handoff information.

11. A method comprising:
communicating through one or more communication links between an aircraft and a destination receiver;
identifying a degraded communication link event;
compiling network event information related to the degraded communication link event in a degraded link event report;
transmitting the degraded link event report to a network issue detector;
analyzing multiple degraded link event reports from multiple aircraft by the network issue detector; and
identifying systemic degraded data link network problems with the one or more communication links based on context identified in the multiple degraded link event reports.

12. The method of claim 11, wherein transmitting the degraded link event report to the network issue detector comprises transmitting the degraded link event report in response to a request for the degraded link event report from the network issue detector.

13. The method of claim 11, wherein transmitting the degraded link event report to the network issue detector comprises automatically transmitting the degraded link event report to the network issue detector.

14. The method of claim 13, wherein automatically transmitting the degraded link event report to the network issue detector comprises transmitting the degraded link event report to the network issue detector after at least one of:
expiration of a period;
occurrence of a communication triggering event; and
occurrence of a report triggering event.

15. The method of claim 14, wherein the communication triggering event includes at least one of:
communication loss through the one or more communication links;
communication degradation through the one or more communication links below a measurable threshold; and
resumption of communications through the one or more communication links.

16. The method of claim 11, wherein compiling the network event information related to the degraded communication link event further comprises compiling the network event information as specified by instructions in a configuration database stored on the aircraft.

17. The method of claim 16, further comprising configuring the instructions stored in the configuration database as directed by the network issue detector.

18. The method of claim 16, wherein the configuration database specifies the network issue detector as a recipient for a transmission of the degraded link event report.

19. A system comprising:
a plurality of aircraft, wherein an aircraft in the plurality of aircraft communicates through one or more communication links, the aircraft comprising:
one or more processors that compile network event information related to degraded communication link events; and
one or more memory units that store a degraded link event report and a configuration database, wherein the degraded link event report stores the compiled network event information related to the degraded communication link events as directed by information in the configuration database; and
a network issue detector in communication with the plurality of aircraft, wherein the network issue detector receives degraded link event reports from the plurality of aircraft, wherein the network issue detector comprises one or more network issue detector processors that identify systemic degraded data link network problems with the one or more communication links based on context identified in the degraded link event reports.

20. The system of claim 19, wherein the aircraft sends a respective degraded link event report to the network issue detector in response to a request for the degraded link event report from the network issue detector.

* * * * *